G. A. ROBERDS.
CAMERA ATTACHMENT.
APPLICATION FILED SEPT. 21, 1908.
948,868.
Patented Feb. 8, 1910.
2 SHEETS—SHEET 1.
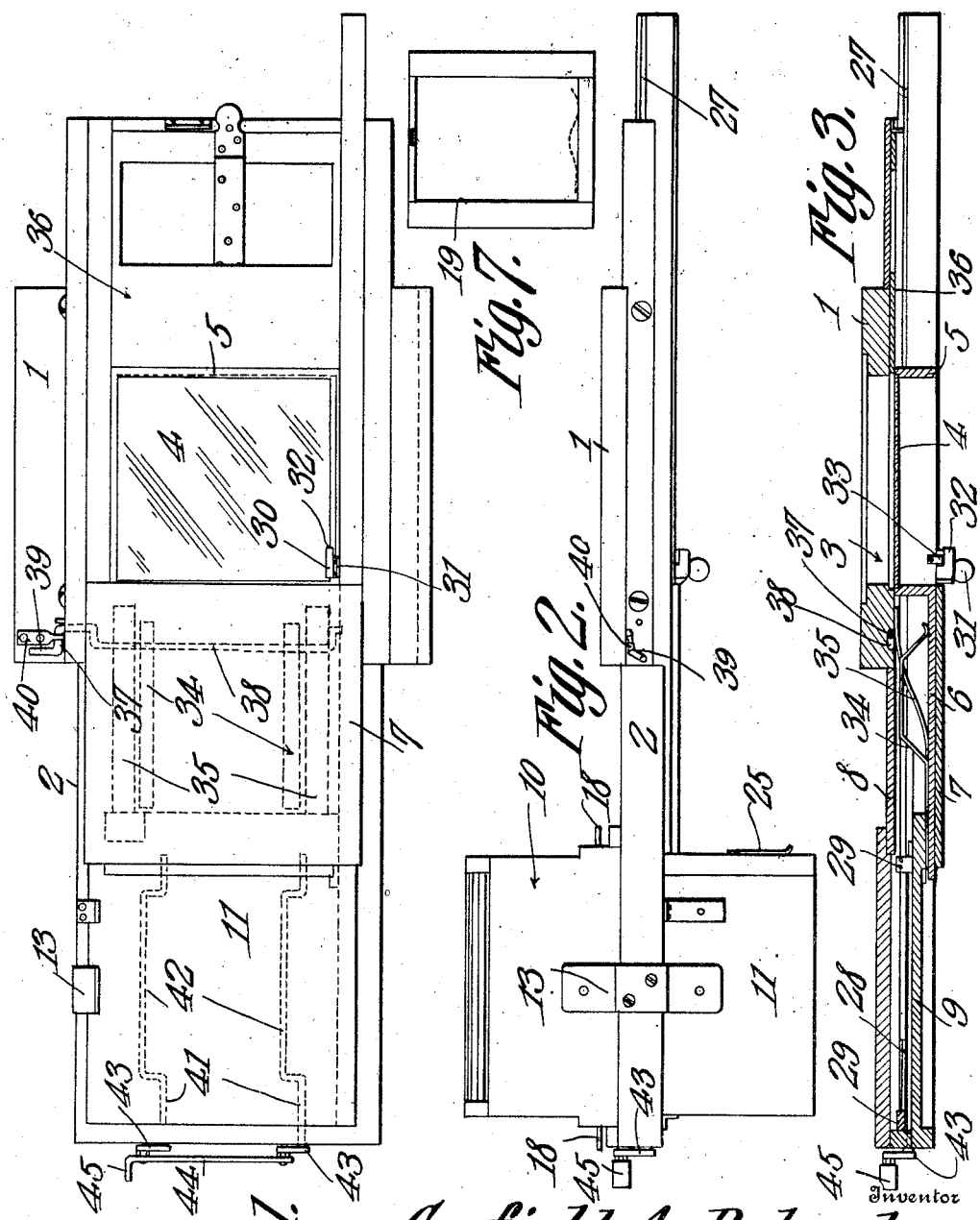
Witnesses
Inventor
Garfield A. Roberds.
By C. A. Snow & Co.
Attorneys

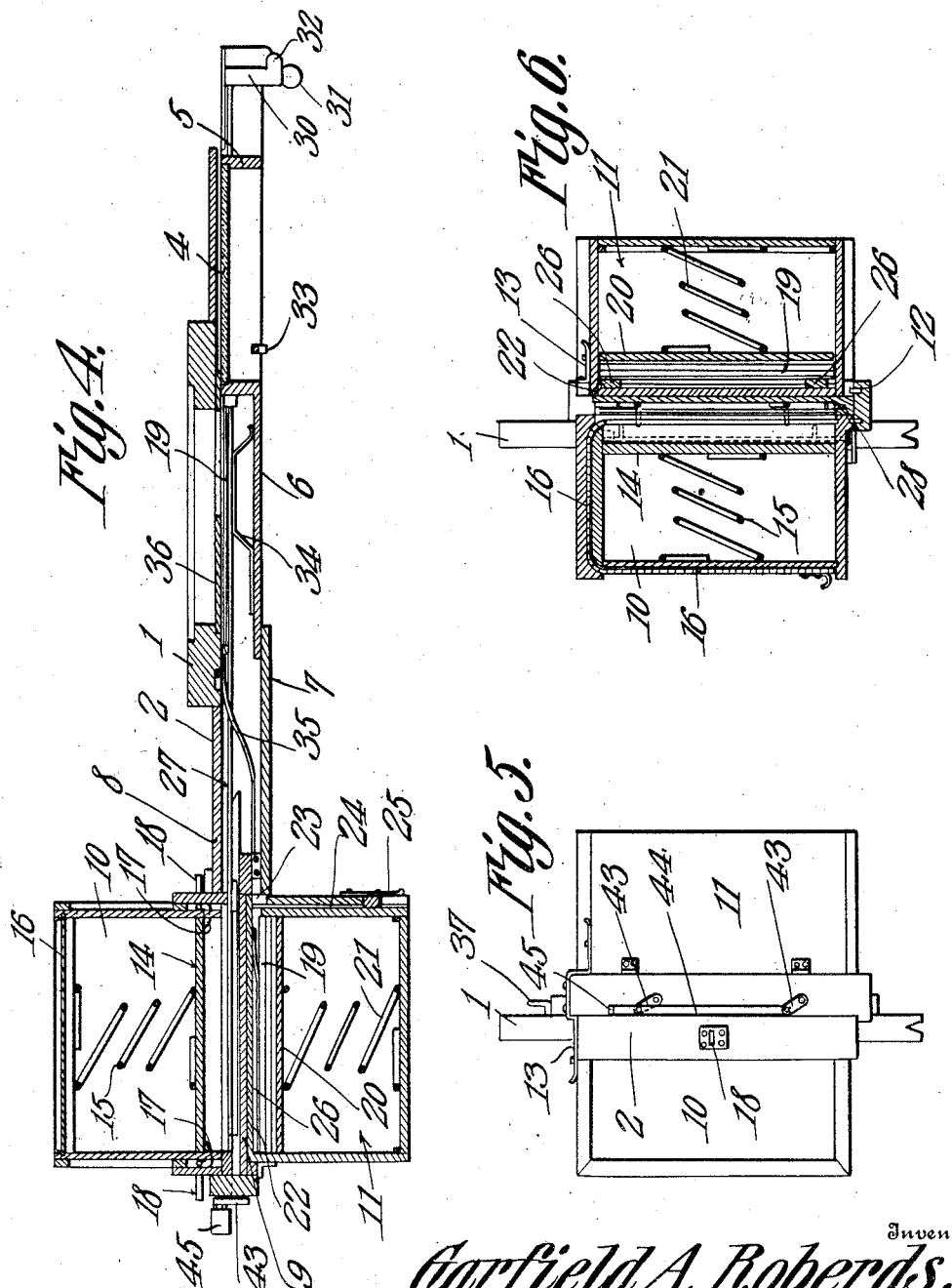

UNITED STATES PATENT OFFICE.

GARFIELD A. ROBERDS, OF OLATHE, KANSAS, ASSIGNOR OF FORTY-FIVE ONE-HUNDREDTHS TO JOHN W. BREYFOGLE AND TEN ONE-HUNDREDTHS TO CHAS. H. NEAL, OF OLATHE, KANSAS.

CAMERA ATTACHMENT.

948,868.   Specification of Letters Patent.   Patented Feb. 8, 1910.

Application filed September 21, 1908. Serial No. 453,910.

*To all whom it may concern:*

Be it known that I, GARFIELD A. ROBERDS, a citizen of the United States, residing at Olathe, in the county of Johnson and State of Kansas, have invented a new and useful Camera Attachment, of which the following is a specification.

This invention has reference to improvements in attachments for photographic cameras being intended more particularly for use in that class of photographic cameras known as portrait cameras, although useful in other connections, and its object is to provide a magazine attachment for portrait cameras wherein each plate is supported in a suitable carrier but without dark slides and so protected as to be prevented from engagement with other plates, thus saving the sensitive film from harm.

In accordance with the present invention each photographic plate is mounted in a suitable carrier which may be little if any thicker than the plate itself, and these carriers with the plates are housed in a suitable dark box which may be attached to the extended back of a photographic camera on one side of such back while on the opposite side of the back another dark box intended to receive the exposed plates may be mounted. The plates are presented successively to a manipulating member or carrier by means of which they may be moved into coincidence with the focal plane of the lens for exposure and then on the return movement of the carrier to a position to receive a second plate the exposed plate and its support are diverted into the receiving dark box, this action being automatic, but still controllable so that in event of the plate not being exposed after being brought into coincidence with the focal plane of the lens, it may be again returned into the original dark box from which it was taken. Provision is also made for the moving of the focusing screen away from its active position and out of the path of the photographic plate by the act of moving the photographic plate into active position.

The invention also comprises other features which will appear, together with the main features of the invention from a consideration of the following detail description taken in connection with the accompanying drawings forming a part of this specification, in which drawings, Figure 1 is a rear elevation of the improved attachment for cameras. Fig. 2 is a plan view thereof. Fig. 3 is a horizontal section through the structures of Figs. 1 and 2 with the dark boxes omitted, and showing the initial position of the parts. Fig. 4 is a similar section with the dark boxes in place and a photographic plate in position to be exposed to the light rays coming through the photographic lens. Fig. 5 is an end elevation of the structure shown in Fig. 1. Fig. 6 is a vertical section through the structure of Fig. 5 at about the central point of the dark boxes. Fig. 7 is a detail view of one of the frames for carrying a photographic plate.

Referring to the drawings there is shown a portion of the back 1 of a camera, and this may be taken as illustrative of a camera of the portrait type or any other suitable type, since the invention while particularly adapted for use in connection with portrait cameras is by no means limited to such use, since it may be used either in part or in whole in other connections than those shown in the drawings.

Secured to the back 1 of the camera is a laterally extending back board or frame 2 which may in general structures resemble the supporting frames for the ground glass focusing screen and plate holders commonly used in connection with portrait cameras.

The camera is provided with the usual opening 3 for the passage of light either to the focusing screen 4 or to the photographic plate as the case may be. The screen 4 is mounted in a frame 5 capable of sliding in the back member 2 and at one edge this frame is provided with an extension 6 capable of sliding into and out of a space between two separated members 7 and 8 at the back and front of the back member 2 respectively. The members 7 and 8 are designed to prevent access of light to the photographic plate during its passage between them as will hereinafter appear. Still further away from the camera back 1, the member 2 carries an opaque wall 9 for a purpose which will presently appear. There are provided two dark boxes 10 and 11, the dark box 10 being designed to contain a number of photographic plates before exposure and the dark box 11 being designed to receive said plates after exposure. These boxes are adapted to be applied to the back 2 on opposite sides of the wall 9 by means of pins 12 and snap catches 13 in the manner common to photographic cameras.

The receiving box or magazine 10 is rectangular in cross section and of a depth sufficient to receive a number of photographic plates, say from six to twelve, depending on the size of the camera, but it is to be understood that the number mentioned is by no means the number to which the use of the invention is confined.

Within the box 10 is a follower 14 constantly under the action of a suitable spring 15 and the side of the box toward which the follower is urged by the spring 15 is normally closed by a curtain slide 16 of the usual construction found in photographic cameras. At the open side of the box, that is the side which may be closed by the curtain slide, there are provided catches 17 under the control of pins 18 projecting beyond the walls of the box so that the catches may be easily manipulated by the operator. These catches may be of the ordinary spring type commonly found in photographic cameras of the magazine type and consequently no detail description thereof is deemed necessary. These catches yield readily to the insertion of a plate but lock the same against removal from the magazine except when the pins 18 are properly manipulated.

The magazine 10 is designed to receive the plates when mounted in carriers 19 one of which is separately shown in Fig. 7. These carriers are rectangular frames similar to the adapters used in connection with ordinary plate holders to receive plates of a smaller size than those for which the plate holder is made so that the smaller size plates may be carried by the plate holder. These plate carriers or adapters are but little thicker than the plates to be carried thereby, and they differ from the ordinary plate holder also in having no dark slide, the photographic plate being therefore exposed on the film side, though covered on the glass side by a suitable back. The holders 19 are of sufficient thickness to protect the film side of a plate from contact with the preceding plate holder and the several holders with the plates therein are inserted in the dark box with the film side inward.

The dark box is of course filled in the dark room and the plate carriers 19 into which the plates have also been placed in the dark room are inserted through the open end of the box past the catches 17 and against the follower 14, compressing the spring 15, and all the carriers are held in the dark box by the catches 17. When the desired number of plates have been placed in the dark box the curtain slide is moved to close the open face of the box so as to protect the plates from the action of light.

The box 11 for the reception of exposed plates is in general similar to the box 10 and is provided with a follower 20 and spring 21 like the follower 14 and spring 15 of the box 10. The side of the box 11 toward which the follower 20 is urged by the spring 21 may be permanently closed by a wall 22, or this wall may be made removable. Since the box 11 is only to be opened in the dark room and no curtain or other slide is necessary as is the case with the box 10, the box 11 may have any one of its sides removable so that plates which have been inserted in the box 11 in the manner to be presently described may be readily removed in the dark room. One side of the box 11 however, adjacent to the wall 22 is provided with a longitudinal slot 23 and this slot is normally closed by a dark slide 24 under the control of the thumb piece 25, so that the slot 23 may be closed or opened as the case may be and under the circumstances to be mentioned later. Furthermore the inner face of the wall 22 is provided with guide strips 26 with the ends toward the slot 23 beveled. The purpose of this will appear hereinafter.

Extending along the upper face of the lower edge of the back 2 is a longitudinal groove 27 in which slides a rod 28 having near one end two spaced blocks 29 separated a distance equal to the length of the plate carrier 19. The groove 27 and rod 28 are each of such length and the groove is so located with reference to the wall 9 that when the dark box 10 is applied to the front face of the back member 2, that is the face toward the camera lens, and the rod 28 is in the extreme limit of its travel toward the dark box 10, then the blocks 29 will be so located as to receive a plate holder 19 when released from the dark box 10 by a suitable manipulation of the pins 18. When the rod 28 is in this position its other end extends to a point adjacent to the corresponding end of a frame of the focusing screen 4, and at this point the rod carries a laterally projecting finger 30 terminating in a thumb piece 31 within easy reach of the operator, and when the parts are in this position a spring snap 32 engages a pin 33 on the frame of the focusing screen. The focusing screen is therefore constrained to move with the rod 28 when the latter is moved in a direction away from the dark box 10 and this movement continues until the focusing screen has been moved entirely out of coincidence with the opening 3 of the camera back. The parts are so proportioned that the photographic plate has not yet reached the opening 3, that is it has not yet been brought into operative relation to said opening, and then by a suitable manipulation of the catch 32 the thumb piece 31 and extension 30 are released from the pin carrier 33 and the rod may then be moved without carrying the focusing screen with it until the photographic plate is in full coincidence with the opening 3, after which the photographic plate may be exposed in the usual manner to light coming through the camera lens.

The movement of the focusing screen 4 out of coincidence with the opening 3 has brought the extension 6 back of said opening and this extension 6 carries a spring 34 shaped to engage back of the photographic plate and hold the sensitive film of the plate in the focal plane of the lens.

Within the space between the members 7 and 8 but made fast to a fixed portion of the structure, such as that end of the wall 9 adjacent to the opening 3 there is a spring 35 made of a strip of sheet metal and appropriately bent to act as a guide or gate, its free end terminating close to the opening 3 and being in the path of the oncoming photographic plate carrier.

Let it be assumed that the photographic plate has been brought into coincidence with the opening 3 and that it has been exposed to the light image formed by the lens of the camera. The rod or bar 28 is now moved toward the dark box 10 carrying the exposed plate with it in its holder. As soon as the free end of the spring 35 is reached the latter will engage the front of the holder 19 and diverge the said holder toward the member 7, carrying it away from the rod or bar 28. By the time the member 32 has reached the pin 33 the plate holder 19 has been forced away from its position between the lugs 29 by the springs 35, it being understood that there are two such springs engaging the plate holder near the top and bottom thereof, and the said plate holder now lies against the member 7 in the path of the extension or dark slide 6, the latter having served to protect the plate from light while in coincidence with the opening 3. The catch 32 now engages the pin 33 and the further movement of the rod 28 toward the dark box 10 is participated in by the focusing screen frame and the extension or dark slide 6, and the said dark slide 6 then engages the plate holder 19 and forces the same through the slot 23 into the dark box 11, the inclined portions of the strips 26 forcing the said plate holder toward the follower 20 and out of the path of the next succeeding plate holder. Of course, the slide 24 has in the meantime been moved to a position to open the slot 23.

It is sometimes desirable to produce two exposures on one plate and for this purpose there is provided a sliding diaphragm 36 having an opening therethrough corresponding in size to one-half the plate used, the diaphragm as a whole being larger than the plate so as to protect the unexposed half from the action of light. The diaphragm 36 is capable of being moved across the opening 3 in the camera back so as to cover either half of the plate when the latter is coincident with the opening 3, and also movable entirely out of coincidence with the opening 3.

When a sensitive plate has been moved into coincidence with the opening 3 and it is desirable to return it to the magazine dark box 10, as for instance when such sensitive plate has been moved to the opening 3 and it has not then been exposed to the light rays coming through the lens, provision is made for moving the switching springs 35 out of the path of the holder 19 when the bar 28 is returned to its initial position. For this purpose there is provided a rock shaft 37 having an off-set portion 38 in position to engage the free end of the spring switches 35 so as to move them out of the path of the returning plate holder or carrier 19 until the advancing edge of the latter has been moved past the diverting end of the said spring switches. For the purpose of manipulating the rock shaft 37 it is provided exterior to the camera back with a suitable crank 39, and a spring finger 40 in its path serves to normally hold the crank in a position where the off-set portion 38 of the rock shaft 37 is out of engagement with the spring switches 35. By this means the plate and holder which have been moved into coincidence with the camera opening 3 may be returned to the dark box 10, that is, opposite the entrance to said dark box. In order to effect the return of the plate and its holder into the dark box 10 after having been once moved out of the same, the structure 2 immediately adjacent to the dark box 10 is provided with a pair of rock shafts 41 each of which has an eccentric member 42. Each rock shaft 41 is provided with a crank end 43 and the said crank ends of the two shafts are connected by a link 44 for simultaneous movement and this link may be manipulated by means of a suitable handle 45 formed on one end thereof. By turning the two rock shafts 41 together the plate holder 19 together with the plate carried thereby is forced into the dark box 10 past the catches 17 and against the action of the springs 15. When it is desired to remove the dark box 10, especially when the latter still contains unexposed plates, the curtain slide 16 is moved to close the opening in said dark box so that the interior thereof becomes light proof and then the dark box may be removed from the camera extension 2 and transported to the dark room. When it is desired to remove the dark box 11 the slide 24 is moved to a position to close the slot 23 and then the said dark box 11 may be detached from the member 2 and transported to the dark room.

The plate holders or carriers 19 are made square so that while they are inserted into the dark box 10 always in the same position thereto the dark box may be attached to the back 2 in either of two positions so that the plates may be presented to the opening 3 either in the horizontal position or in the vertical position as desired. The square plate holder will be engaged by the carrier equally well irrespective of the position of the dark box.

What is claimed is:—

1. In a photographic camera, a magazine for unexposed plates, a receptacle for exposed plates and separate from magazine, a carrier movable from the magazine to the point of exposure to the light image formed by the camera lens and back again to the magazine, said carrier being provided with means for positively moving a plate from the magazine to the point of exposure and for positively moving the plate from said point of exposure to the receptacle for exposed plates, and means for diverting the plates, on the return movement of the carrier, from the path traversed in the movement toward the point of exposure into another path leading to the receptacle for exposed plates, in which last named path the plate is under the positive control of the carrier.

2. In a photographic camera, a magazine for unexposed plates, a receptacle for exposed plates, a carrier movable from the magazine to the point of exposure to the light image of the camera lens and back again to the magazine, said carrier being provided with means for positively moving the plate in a direct path from the magazine to the point of exposure and for positively moving the plate to the receptacle for exposed plates, and a switch for diverting the plates on the return movement of the carrier away from the path traversed in the movement toward the point of exposure and into another path leading to the receptacle for exposed plates, in which last named path the plates are under the positive control of the carrier.

3. In a photographic camera, a magazine for unexposed plates, a receptacle for exposed plates separate from the magazine, means for moving a plate from the magazine in a direct path to the point of exposure to the light image formed by the camera lens, and for moving the plate on the return of the carrier to the receptacle for exposed plates, and an elastic switch for diverting the plates, on the return movement of the carrier, from the path traversed in the movement to the point of exposure into another path leading to the receptacle for exposed plates.

4. In a photographic camera, a magazine for unexposed plates, a receptacle for exposed plates, means for moving a plate from the magazine to the point of exposure to the light image formed by the camera lens and for returning the plate to the receptacle for exposed plates, and a switch for diverting the plates from the carrier toward the receptacle for exposed plates on the return movement of the carrier out of the path traversed by the plate on its movement toward the point of exposure into another path leading to the receptacle for exposed plates, said switch being inactive to the first movement of the plate and active to the return movement thereof.

5. In a photographic camera, a magazine for unexposed plates, a receptacle for exposed plates, means for moving a plate from the magazine to the point of exposure to the light image formed by the camera lens and for returning the plate to the receptacle for exposed plates, a switch for diverting the plate holder from the carrier toward the receptacle for exposed plates on the return movement of the carrier toward the magazine, and means for moving the switch out of the return path of the plate holder at will.

6. In a photographic camera, a magazine for unexposed plates, a receptacle for exposed plates, separate from the magazine, means for moving a plate in a single plane from the magazine to the point of exposure to the light image formed by the camera lens, and for then moving the plate to the receptacle for exposed plates, a switch for diverting the plate from the carrier toward the receptacle for exposed plates on the return movement of the carrier toward the magazine, and means on the carrier for forcing the exposed plate into the receptacle for exposed plates.

7. In a photographic camera, a magazine dark box substantially square in cross section and having a spring-actuated follower, catches for holding the contents of the dark box against escape, and capable of manipulation from the exterior of the box, a closure for rendering said box light-tight and plate holders each comprising a frame, with a square perimeter and inclosing an opening longer in one direction than the other and adapted to embrace the edges of a plate of like shape, the said frame being the same thickness as the plate.

8. In a photographic camera, an extending back member projecting laterally beyond each side of the camera body and provided with an opening in line with the camera lens, a focusing screen movable across the opening in the back member, a dark screen carried by and to one side of the focusing screen, a carrier for plate holders movable across the opening in the back member and having means for engaging the focusing screen and moving the same for a distance less than the travel of the carrier, and means coacting with the dark screen for diverting exposed plates and the holders therefor away from the carrier.

9. In a photographic camera, plate holders for sensitive plates individual thereto and inclosing the edges only of said plates, a magazine for the plate holders and unexposed plates carried thereby, a carrier for conveying the plate holders and plates into position to expose the plates to the light image produced by the camera lens, and a dark slide movable with the carrier for a portion of the travel of the latter to protect the plates from light.

10. In a photographic camera, plate holders for sensitive plates individual thereto and inclosing the edges only of said plates, a magazine for the plate holders and unexposed plates carried thereby, a receptacle for the plate holders and plates after exposure, a carrier for conveying the plate holders and plates into position to expose the plates to the light image produced by the camera lens, a dark slide movable with the carrier for a portion of the travel of the latter to protect the plates from light, and means coacting with the dark slide for causing the diversion of the plate holders and plates after the exposure of the latter away from the carrier and into the receptacle for exposed plates.

11. In a photographic camera, a magazine for unexposed plates and provided with means for the exclusion of light, said magazine being attachable as a whole to the camera in either of two positions, and plate holders adapted to said magazine.

12. In a photographic camera, a square magazine for unexposed plates and provided with means for the exclusion of light, said magazine being attachable as a whole to the camera in either of two positions, square plate holders for the plates and adapted to said magazine, the plate holders each comprising a frame inclosing an opening longer in one direction than the other, and a carrier for receiving the plate holders from the magazine in either position of the latter and movable therefrom to carry the plate holders with the plates into operative relation to the camera lens.

In testimony that I claim the foregoing as my own, I have hereto affixed my signature in the presence of two witnesses.

GARFIELD A. ROBERDS.

Witnesses:
RALSTON WALKER,
W. R. WELDON.